United States Patent
Matsunami et al.

(10) Patent No.: US 11,592,057 B2
(45) Date of Patent: Feb. 28, 2023

(54) BEARING DEVICE AND ROTARY DEVICE USING BEARING DEVICE

(71) Applicant: JTEKT CORPORATION, Kariya (JP)

(72) Inventors: Jun Matsunami, Kashiwara (JP); Kouichi Okuda, Tondabayashi (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/483,141

(22) Filed: Sep. 23, 2021

(65) Prior Publication Data

US 2022/0099140 A1    Mar. 31, 2022

(30) Foreign Application Priority Data

Sep. 29, 2020   (JP) .............................. JP2020-162851

(51) Int. Cl.
*F16C 19/54*    (2006.01)
*F16C 19/08*    (2006.01)
*H01J 35/10*    (2006.01)

(52) U.S. Cl.
CPC ............ *F16C 19/548* (2013.01); *F16C 19/08* (2013.01); *H01J 35/1024* (2019.05); *F16C 2380/16* (2013.01)

(58) Field of Classification Search
CPC ...... F16C 19/08; F16C 19/546; F16C 19/547; F16C 19/548; F16C 35/06; F16C 35/12; F16C 2380/16; H01J 35/1024; H01J 2235/1046
See application file for complete search history.

(56) References Cited

U.S. PATENT DOCUMENTS

| | | | | |
|---|---|---|---|---|
| 7,343,002 | B1 * | 3/2008 | Lee ........................ | F16C 33/66 378/132 |
| 7,995,708 | B2 * | 8/2011 | Andrews ............. | H01J 35/1024 378/131 |
| 8,523,448 | B1 * | 9/2013 | Damato ................ | F16C 25/083 378/132 |
| 10,995,798 | B2 * | 5/2021 | Sato ........................ | F16C 33/62 |

FOREIGN PATENT DOCUMENTS

JP          H07-224837 A         8/1995

* cited by examiner

*Primary Examiner* — James Pilkington
(74) *Attorney, Agent, or Firm* — Oliff PLC

(57) ABSTRACT

A bearing device includes a rotational shaft; a first outer ring; a second outer ring; first balls; second balls disposed; and a C-spacer and a second spacer. α>δd is satisfied, where δd represents a difference between an inside diameter of the second spacer at an end portion on a second side and an outside diameter of a shaft outer circumferential face, and α represents a half of a difference between a diameter of a cylindrical face of the C-spacer on an outer circumferential side and a diameter of the cylindrical face of the C-spacer on an inner circumferential side.

3 Claims, 9 Drawing Sheets

BEARING DEVICE AND ROTARY DEVICE USING BEARING DEVICE

CROSS-REFERENCE TO RELATED APPLICATION

This application claims priority to Japanese Patent Application No. 2020-162851 filed on Sep. 29, 2020, incorporated herein by reference in its entirety.

BACKGROUND

1. Technical Field

The disclosure relates to a bearing device that supports a rotational shaft, and more particularly to a bearing device in which an inner-side raceway surface is integrally provided on the rotational shaft.

2. Description of Related Art

A bearing device 70 as illustrated in FIG. 7 is known as a bearing device that supports a rotational shaft (Japanese Unexamined Patent Application Publication No. 07-224837 (JP 07-224837 A)). In this bearing device 70, a rotational shaft 71 and two rolling bearings 72 and 73 that support the rotational shaft 71 are integrally combined, and the bearing device 70 is used for supporting a tungsten target in an X-ray tube such that the target is rotatable (see FIG. 2). The rolling bearings 72 and 73 are so-called integrated rolling bearings, with two inner-side raceway surfaces 75a and 75b being directly provided on the rotational shaft 71. The rolling bearings 72 and 73 are angular ball bearings.

The two rolling bearings 72 and 73 are combined such that back faces of respective outer rings 76 and 81 face each other. A spacer is installed between the outer ring 76 and the outer ring 81, defining the distance between the outer rings. The axial-direction spacing between outer-side raceway surfaces 77 and 82 is equal to the axial-direction spacing between two inner-side raceway surfaces 75a and 75b. The spacer includes an outer ring spacer 78 having a cylindrical shape, and a C-spacer 79 in which a part in the circumferential direction has been cut away. The C-spacer 79 has an annular shape obtained by cutting away a part of the circumference, as viewed in the axial direction, as illustrated in portion (a) in FIG. 7. An inner width w at a cutaway portion 80 is set to be slightly larger than an outside diameter d0 of the rotational shaft 71.

The rolling bearings 72 and 73 are assembled as follows. The outer ring 76 is disposed outward of the rotational shaft 71 in the radial direction. The inner-side raceway surface 75a is situated above the inner-side raceway surface 75b in the vertical direction (the up-down orientation is opposite to that illustrated in FIG. 7), and the rotational shaft 71 is moved so that the center axis of the rotational shaft 71 follows the vertical direction. The outer ring 76 is positioned so that the raceway surface of the outer ring 76 is situated below the inner-side raceway surface 75a in the vertical direction. A plurality of balls 74 is inserted between the inner-side raceway surface 75a and the raceway surface of the outer ring 76. A state is created in which the inner-side raceway surface 75a and the balls 74 are in contact, and in which the raceway surface of the outer ring 76 and the balls 74 are in contact. In this state, the orientation is set such that the inner-side raceway surface 75a is situated below the inner-side raceway surface 75b in the vertical direction (the orientation illustrated in FIG. 7), and the rotational shaft is moved so that the center axis of the rotational shaft 71 follows the vertical direction. The outer ring spacer 78 is positioned outward of the rotational shaft 71 in the radial direction so as to come into contact with the outer ring 76. The outer ring 81 is positioned outward of the rotational shaft 71 in the radial direction. The outer ring 81 is positioned so that the raceway surface of the outer ring 81 is situated below the inner-side raceway surface 75b in the vertical direction. A plurality of the balls 74 is inserted between the inner-side raceway surface 75b and the raceway surface of the outer ring 81. A state is created in which the inner-side raceway surface 75b and the balls 74 are in contact, and in which the raceway surface of the outer ring 81 and the balls 74 are in contact. The C-spacer 79 is positioned outward of the rotational shaft 71 in the radial direction so as to come into contact with the outer ring spacer 78 and the outer ring 81.

Thus, the two rolling bearings 72 and 73 are assembled in a state in which the C-spacer 79 is not installed, and thereafter the C-spacer 79 is inserted from the radial direction between one outer ring 81 and the outer ring spacer 78, whereby the two outer rings 76 and 81 are installed at the predetermined interval in the axial direction. After the rotational shaft 71 and the two rolling bearings 72 and 73 are integrally combined, the bearing device 70 is installed into a housing of the X-ray tube.

SUMMARY

The clearance in the bearing device 70 decreases when being used in high-temperature environments, and accordingly the rolling bearings 72 and 73 are both installed with a positive clearance (in a state with no preload applied) at room temperature, and thus the outer ring spacer 78 and the C-spacer 79 are not in strong contact with each other in the axial direction. Accordingly, the position of the C-spacer 79 is easily displaced in the radial direction with respect to the position of the outer ring spacer 78, and the C-spacer 79 may become tilted and the balls 74 of the rolling bearings 72 and 73 may fall out when the bearing device 70 is assembled or when the bearing device 70 is installed into the X-ray tube, as illustrated in FIGS. 8 and 9.

FIG. 8 is a schematic diagram illustrating the state of the outer ring spacer 78 and the C-spacer 79 in a case where a ball 74 of the rolling bearing 73 falls out in a state in which the inner-side raceway surface 75b is situated above the inner-side raceway surface 75a in the vertical direction. FIG. 8 illustrates the positions of the outer ring spacer 78 and the C-spacer 79 with respect to the rotational shaft 71, as viewed in the axial direction, that is, in the direction of an outline arrow X in FIG. 7. In FIG. 8, a large space k1 is provided between the outer circumference of the rotational shaft 71 and the inner circumference of the outer ring spacer 78 at the left of the rotational shaft 71, due to the position of the outer ring spacer 78 shifting leftward in FIG. 8. The C-spacer 79 is positionally displaced toward the right in FIG. 8 with the cutaway portion 80 thereof facing downward in the drawing, with one end portion 79a of the C-spacer 79 situated in the space k1, and another end portion 79b thereof situated in a space k2 outward of the outer ring spacer 78. In this case, the C-spacer 79 and the outer ring spacer 78 are in contact with each other only at the position indicated by P in FIG. 8, and the end portions 79a and 79b at the opening side of the C-spacer 79 are not supported. Accordingly, the end portions 79a and 79b at the opening side of the C-spacer 79 may respectively enter the spaces k1 and k2, and thus the C-spacer 79 may easily tilt.

FIG. 9 is a schematic diagram illustrating the state in which the C-spacer 79 is tilted, as viewed in the direction of an outline arrow Y in FIG. 8. The outer ring 81 is positioned by contacting the C-spacer 79 in the axial direction, and accordingly when the C-spacer 79 tilts, the outer ring 81 tilts along with the C-spacer 79, and the ball 74 falls out, as illustrated in FIG. 9.

The disclosure provides a bearing device in which tilting of a C-spacer is restrained and thus the posture of a rolling bearing is reliably supported and balls are reliably restrained from falling out, when the bearing device is attached to an X-ray tube or the like.

A first aspect of the disclosure relates to a bearing device including a rotational shaft that includes a first inner-side raceway surface on an outer circumference at a first side in an axial direction, a second inner-side raceway surface on the outer circumference at a second side in the axial direction, and a shaft outer circumferential face having a cylindrical shape between the first inner-side raceway surface and the second inner-side raceway surface; a first outer ring that includes a first outer-side raceway surface on an inner circumference, and a back face facing the second side in the axial direction; a second outer ring that includes a second outer-side raceway surface on an inner circumference, and a back face facing the first side in the axial direction; a plurality of first balls disposed rollably between the first inner-side raceway surface and the first outer-side raceway surface; a plurality of second balls disposed rollably between the second inner-side raceway surface and the second outer-side raceway surface; and a C-spacer and a second spacer that are disposed continuously in the axial direction, between the first outer ring and the second outer ring. The C-spacer is disposed between the second spacer and the second outer ring, the C-spacer is an annular body with a cutaway portion at a part of a circumference, the C-spacer has an inner circumferential face that is constituted by a part of a cylindrical face and an outer circumferential face that is constituted by a part of a cylindrical face, and a center axis of the inner circumferential face of the C-spacer is same as a center axis of the outer circumferential face of the C-spacer; the second spacer includes an annular body at least at an end portion on the second side, an inner circumferential face of the second spacer is a cylindrical face and an outer circumferential face of the second spacer is a cylindrical face, and a center axis of the inner circumferential face of the second spacer is same as a center axis of the outer circumferential face of the second spacer; in a state in which the first balls are in contact with the first inner-side raceway surface and the first outer-side raceway surface, and the second balls are in contact with the second inner-side raceway surface and the second outer-side raceway surface, a dimension between the back face of the first outer ring and the back face of the second outer ring in the axial direction is longer than an axial-direction dimension obtained by adding a dimension of the C-spacer in the axial direction and a dimension of the second spacer in the axial direction; and $\alpha > \delta d$ is satisfied, where $\delta d$ represents a difference between an inside diameter of the second spacer at the end portion on the second side and an outside diameter of the shaft outer circumferential face, and $\alpha$ represents a half of a difference between a diameter of the cylindrical face of the C-spacer on an outer circumferential side and a diameter of the cylindrical face of the C-spacer on an inner circumferential side.

A second aspect of the disclosure relates to a rotary device including a housing of which an inner circumference is cylindrical, and the bearing device according to the first aspect. The bearing device is fitted in the housing; and $\alpha < (d1-d0)/2 - (D-d2)$ is satisfied, where d0 represents the outside diameter of the shaft outer circumferential face at a position of the C-spacer, d1 represents an outside diameter of a bearing outside face of the second outer ring, d2 represents the diameter of the cylindrical face of the C-spacer on the outer circumferential side, D represents an inside diameter of the housing, and $\alpha$ represents the half of the difference between the diameter of the cylindrical face of the C-spacer on the outer circumferential side and the diameter of the cylindrical face of the C-spacer on the inner circumferential side.

According to the above aspects of the disclosure, tilting of the C-spacer is restrained, and thus, the posture of the rolling bearing is supported in a direction orthogonal to the center axis, and balls can be reliably restrained from falling out, when the bearing device is attached. Accordingly, man-hours for reworking, such as reassembling of the bearing device, can be reduced when the bearing device is attached. Thus, efficiency of the attaching operation (i.e., the attaching work) can be markedly improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIGS. 3A and 3B are views of a C-spacer, in which FIG. 3A is a cross-sectional view passing through a center position thereof, and FIG. 3B is a planar view;

DETAILED DESCRIPTION OF EMBODIMENTS

Figure 1:
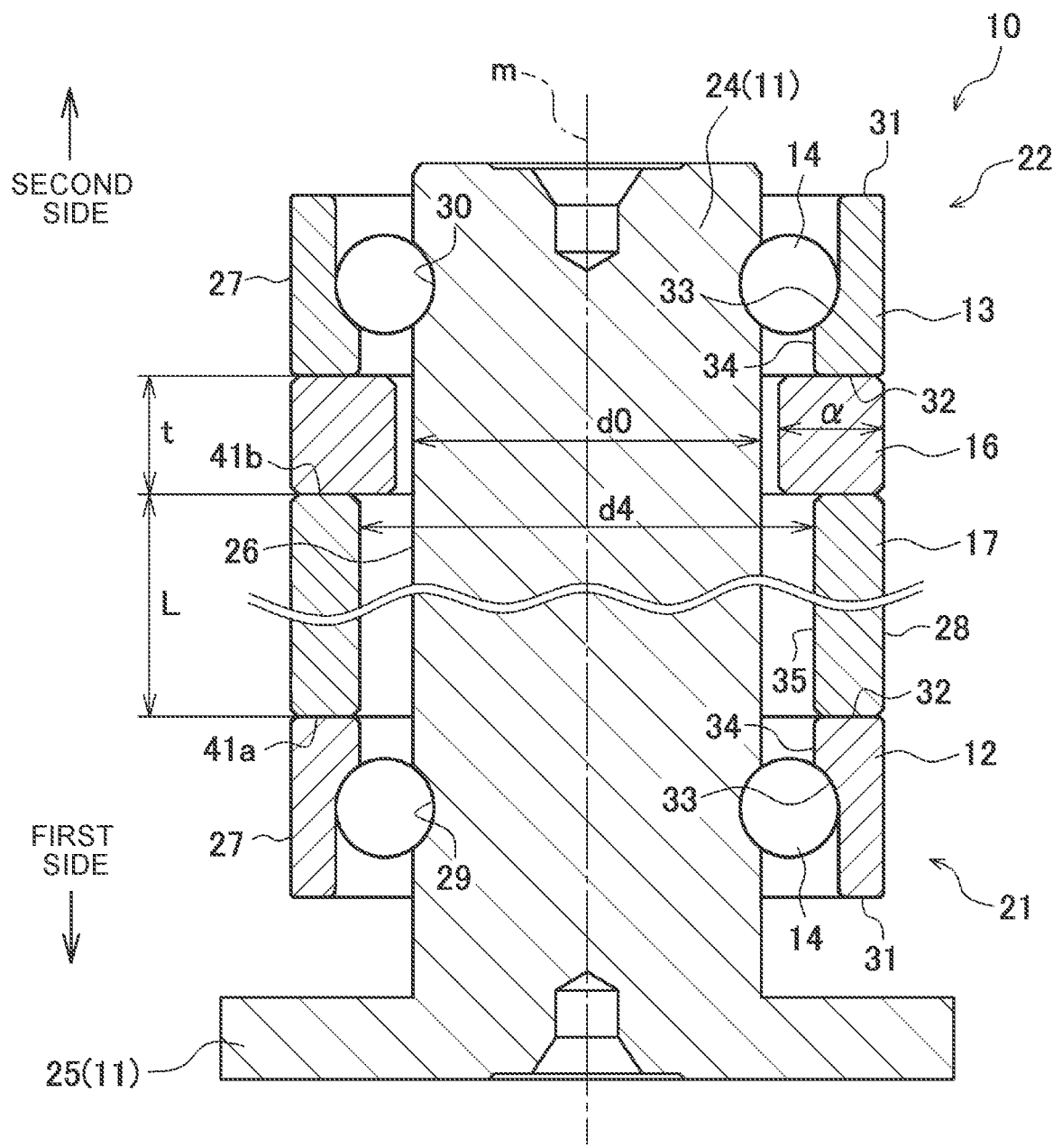
FIG. 1 is an axial direction sectional view of a bearing device according to an embodiment of the disclosure.
Figure 2:
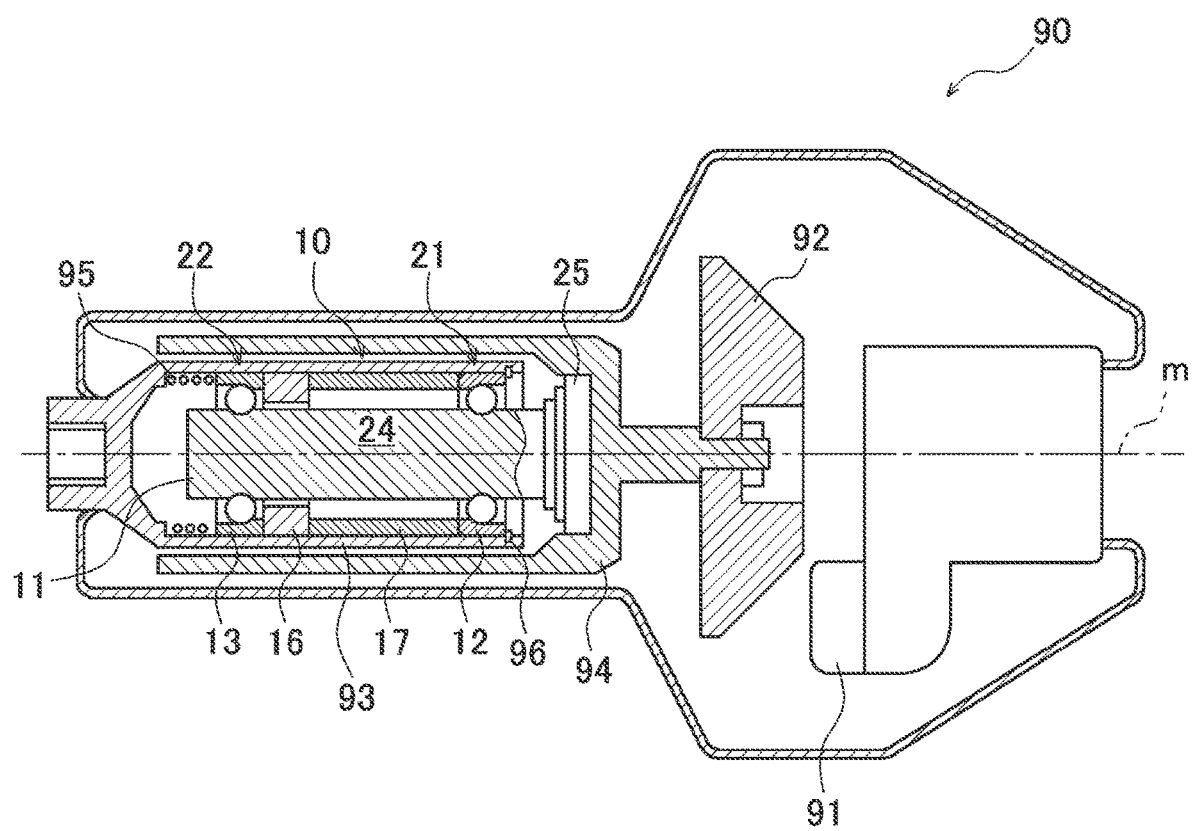
FIG. 2 is an axial direction sectional view of an X-ray tube in which the bearing device is installed.

An embodiment of the disclosure will be described in detail with reference to the drawings. FIG. 1 is an axial direction sectional view of a bearing device 10 according to an embodiment of the disclosure (hereinafter, "present embodiment"). FIG. 2 is an axial direction sectional view of an X-ray tube 90 (rotary device) in which the bearing device 10 is installed. Note that a feature of the disclosure is an effect of preventing balls 14 from falling out when the bearing device 10 is assembled. Accordingly, FIG. 1 shows a center axis m oriented in the up-down direction, in accordance with the layout when the bearing device 10 is assembled.

Referring to FIG. 2, the X-ray tube 90 is provided with an electron gun 91 that emits an electron beam, and is a device that generates X-rays by irradiating a tungsten target 92 in a vacuum container with the electron beam. The temperature of the target 92 rises to around 1000° C. when the target 92 is irradiated with the electron beam, and accordingly the target 92 is attached to a rotating shaft so that the electron beam is not concentrated on one portion thereof. The bearing device 10 is fitted in and installed in a housing 93 provided in the X-ray tube 90, and supports the target 92 such that the target 92 is rotatable. In the following description, a direction in which the center axis m of the bearing device 10 extends will be referred to as "axial direction", a direction orthogonal to the center axis m as "radial direction", and a direction circling around the center axis m as "circumferential direction".

Referring to FIG. 1, the bearing device 10 has a form of a so-called integrated rolling bearing in which a rotational shaft 11 is supported by two angular rolling bearings, and the inner-side raceway surfaces of the two rolling bearings are disposed directly on the rotational shaft 11. In the following description, the rolling bearing on the lower side in the drawings (hereinafter, "first side") will be referred to as "first bearing 21", and the rolling bearing on the upper side in the drawings (hereinafter, "second side") will be referred to as "second bearing 22".

The bearing device 10 includes the rotational shaft 11, a first outer ring 12, a second outer ring 13, a plurality of balls 14, a C-spacer 16, and an outer ring spacer 17 (second spacer).

The rotational shaft 11 is manufactured using (i.e., the rotational shaft 11 is made of) a high speed tool steel that has heat resistance, such as SKH4 (T5) or M50 or the like. The rotational shaft 11 includes a substantially columnar shaft portion 24, and a flange portion 25 that is provided on one end portion of the shaft portion 24 in the axial direction, and that is provided integrally with the shaft portion 24. The flange portion 25 has a disc shape extending in the radial direction, and is fixed to a rotor 94 and the target 92 of the X-ray tube 90 (FIG. 2) by an unshown bolt. Raceway surfaces are provided over the entire outer circumference of the shaft portion 24, at two locations away from each other in the axial direction. A first inner-side raceway surface 29 is provided at the first side in the axial direction, and a second inner-side raceway surface 30 is provided at the second side in the axial direction. The inner-side raceway surfaces 29 and 30 are arc-shaped in an axial-direction sectional view, and are recessed toward the inner side in the radial direction, and both have the same shape. The radius of curvature of the inner-side raceway surfaces 29 and 30 in axial direction sectional view is slightly larger than the radius of curvature of the surface of each of the balls 14. An outer circumferential face 26 (shaft outer circumferential face) of the shaft portion 24 between the first inner-side raceway surface 29 and the second inner-side raceway surface 30 has a cylindrical shape centered on the center axis m.

The first bearing 21 includes the first inner-side raceway surface 29, the balls 14 (first balls), and the first outer ring 12, and the second bearing 22 includes the second inner-side raceway surface 30, the balls 14 (second balls), and the second outer ring 13. Note that in the description of the configurations of the first bearing 21 and the second bearing 22, the first outer ring 12 and the second outer ring 13 have the same shape, and accordingly description will be made using the first outer ring 12 as a representative example, and description of the second outer ring 13 will be omitted.

The first outer ring 12 has an annular shape, and a bearing outside face 27 thereof is a cylindrical face centered on the center axis m. An outer-side raceway surface 33 is provided on the entire inner circumference, at the middle thereof in the axial direction. The outer-side raceway surface 33 is arc-shaped in axial-direction sectional view, and is recessed toward the outer side in the radial direction. The radius of curvature of the outer-side raceway surface 33 in axial direction sectional view is slightly larger than the radius of curvature of the surface of each of the balls 14. Note that the outer-side raceway surface 33 provided in the first outer ring 12 may also be referred to as "first outer-side raceway surface", and the outer-side raceway surface 33 provided in the second outer ring 13 as "second outer-side raceway surface". A shoulder 34 is provided on one end of the outer-side raceway surface 33 in the axial direction. The inside diameter of the shoulder 34 is smaller than the groove bottom diameter of the outer-side raceway surface 33. At the other end of the outer-side raceway surface 33 in the axial direction, the inner circumference of the first outer ring 12 is a cylindrical face with a diameter that is substantially the same as the groove bottom diameter of the outer-side raceway surface 33. Side faces that are each orthogonal to the center axis m and that are parallel to each other are respectively provided on both sides of the first outer ring 12 in the axial direction. The side face on the side on which the shoulder 34 is provided is referred to as a back face 32, and the side face on the opposite side therefrom is referred to as a front face 31.

In the bearing device 10, the first outer ring 12 and the second outer ring 13 are installed to face in directions opposite to each other. The first outer ring 12 is installed with the back face 32 facing the second side, and the second outer ring 13 is installed with the back face 32 facing the first side. Each of the first outer ring 12 and the second outer ring 13 supports load in the radial direction. In addition, the first outer ring 12 can support axial load toward the second side of the rotational shaft 11, and the second outer ring 13 can support axial load toward the first side of the rotational shaft 11.

The outer ring spacer 17 and the C-spacer 16 are installed continuously (i.e., the outer ring spacer 17 and the C-spacer 16 are installed to be continuous with each other) in the axial direction, between the first outer ring 12 and the second outer ring 13. The C-spacer 16 is installed between the outer ring spacer 17 and the second outer ring 13. The outer ring spacer 17 is manufactured using (i.e., the outer ring spacer 17 is made of) a steel material such as stainless steel 403 (S40300) that has a coefficient of linear expansion equivalent to that of the steel material forming the rotational shaft 11, to suppress change in the axial-direction clearance between the bearings 21 and 22 due to change in temperature. The outer ring spacer 17 has a tubular shape, and each of an outer circumferential face 28 and an inner circumferential face 35 is a cylindrical face extending in the axial direction with the center axis m as the center thereof. The outside diameter of the outer circumferential face 28 is slightly smaller than the outside diameter of each of the bearing outside faces 27 of the outer rings 12 and 13, and an inside diameter d4 of the inner circumferential face 35 is substantially the same as the inside diameter of the shoulder 34. Side faces 41a and 41b that are each orthogonal to the center axis m and that are parallel to each other are respectively provided on both sides of the outer ring spacer 17 in the axial direction.

Figure 3A:
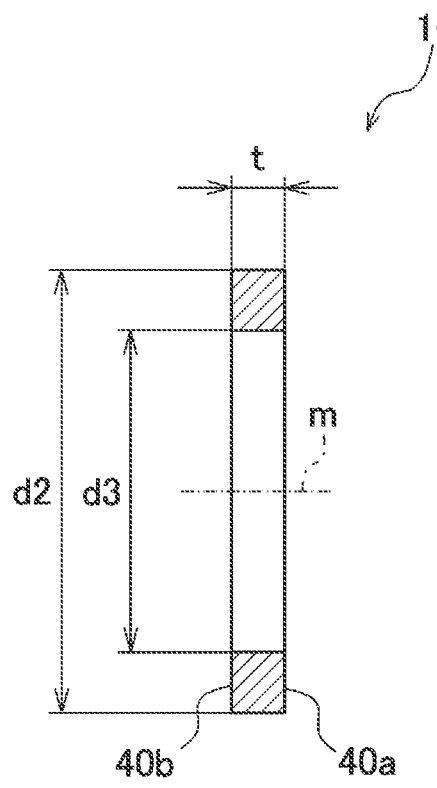
Figure 3B:
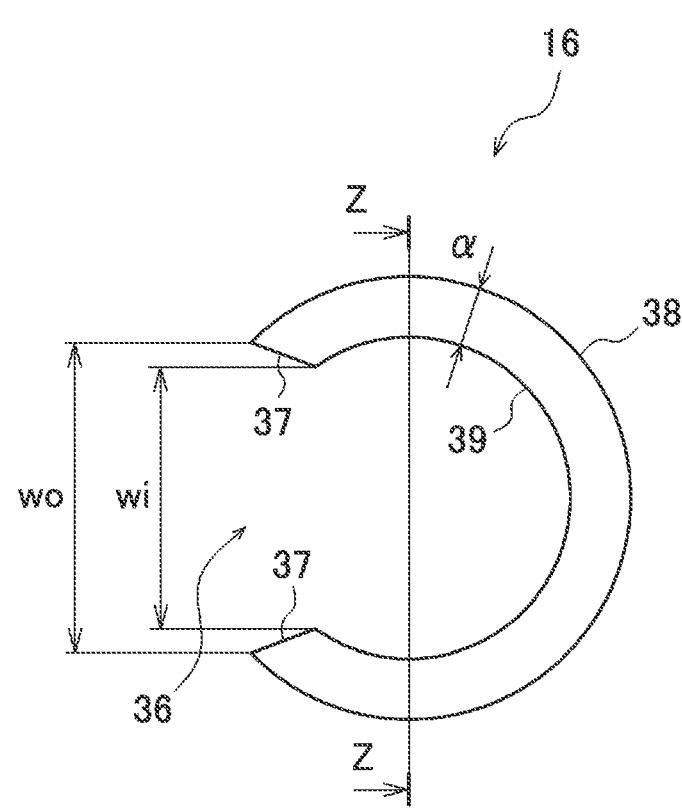

FIG. 3B is a planar view of the C-spacer 16, and FIG. 3A is an axial direction sectional view thereof viewed from the direction of arrows Z at a center position in FIG. 3B. The C-spacer 16 is manufactured using (i.e., the C-spacer 16 is made of) a steel material such as stainless steel 403 (S40300), in the same way as the outer ring spacer 17. The C-spacer 16 has a cutaway portion 36 obtained by cutting away a part of an annular body in the circumferential direction. Opening faces 37 that face each other in the circumferential direction across the cutaway portion 36 are provided at the end portions on the sides of the cutaway portion 36, as illustrated in FIG. 3B. An inner width wi at the narrowest position between the opening faces 37 is set to be slightly larger than the outside diameter of the shaft portion 24, to facilitate attachment of the C-spacer 16, in later-described assembly of the bearing device 10. Each of an outer circumferential face 38 and an inner circumferential face 39 of the C-spacer 16 is constituted by a part of a cylindrical face centered on the center axis m. Also, side faces 40a and 40b on both sides in the axial direction are faces that are each orthogonal to the center axis m and are parallel to each other. The thickness of the C-spacer 16 in the axial direction is a dimension t that is uniform in the circumferential direction.

A feature of the present embodiment is a thickness α of the C-spacer 16 in the radial direction. The thickness α of the C-spacer 16 in the radial direction is a dimension that is the difference between a dimension (radius) from the center axis m to the outer circumferential face 38 and a dimension (radius) from the center axis m to the inner circumferential face 39, and is a size that is half the difference between a diameter d2 of the outer circumferential face 38 and a diameter d3 of the inner circumferential face 39 of the C-spacer 16. The thickness α of the C-spacer 16 in the radial direction is set to be larger than the difference between the inside diameter d4 of the inner circumferential face 35 of the outer ring spacer 17 and an outside diameter d0 of the outer circumferential face 26 of the shaft portion 24. In the present embodiment, a situation in which tilting of the C-spacer 16 occurs and the balls 14 fall out at the time of assembly work is prevented by setting the thickness α of the C-spacer 16 in the radial direction in this way. Advantageous effects of restraining tilting of the C-spacer 16 will be described later in detail, after description of other configurations.

It can also be understood from FIG. 1 that the spacing between the first outer ring 12 and the second outer ring 13 in the axial direction is restricted by a dimension L of the outer ring spacer 17 in the axial direction and the dimension t of the C-spacer 16 in the axial direction. In the bearing device 10, in a state in which the balls 14 are in contact with the first inner-side raceway surface 29 and the outer-side raceway surface 33 (first outer-side raceway surface) at the first bearing 21, and the balls 14 are in contact with the second inner-side raceway surface 30 and the outer-side raceway surface 33 (second outer-side raceway surface) at the second bearing 22, the dimension between the back face 32 of the first outer ring 12 and the back face 32 of the second outer ring 13 in the axial direction is set to be longer than the axial-direction dimension obtained by adding the dimension L of the outer ring spacer 17 in the axial direction and the dimension t of the C-spacer 16 in the axial direction, by a dimensional difference δL. In the present embodiment, this dimensional difference δL is set to be approximately 0.05 mm to 0.5 mm. Thus, the first bearing 21 and the second bearing 22 are attached with a clearance in the axial direction. A state in which there is such a clearance in the axial direction is referred to as "positive clearance". Thus, the outer ring spacer 17 and the C-spacer 16 are installed without being in strong contact with each other in the axial direction.

Figure 4A:
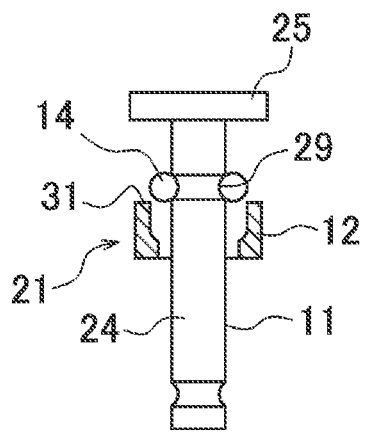
FIG. 4A is an explanatory diagram illustrating a process of assembling the bearing device.

Assembly processes for the bearing device 10 will be described with reference to FIGS. 4A through 4D. FIGS. 4A through 4D are explanatory diagrams illustrating processes of assembling the bearing device 10. First, as illustrated in FIG. 4A, the first bearing 21 is assembled in a state in which the flange portion 25 is on the upper side in the vertical direction and the center axis of the rotational shaft 11 is positioned to extend in the vertical direction. At this time, the first outer ring 12 is fitted to the shaft portion 24 of the rotational shaft 11 with the front face 31 facing the upper side in the vertical direction, at a position below the first inner-side raceway surface 29 in the vertical direction, in advance. The balls 14 are placed along the first inner-side raceway surface 29, and thereafter the first outer ring 12 is moved toward the upper side in the vertical direction and fitted to the outer circumferences of the balls 14.

Figure 4B:
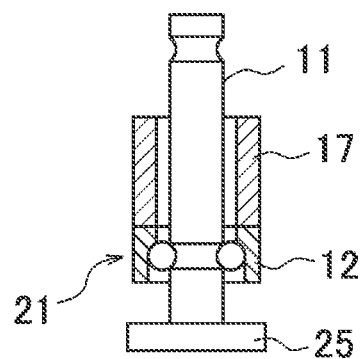
FIG. 4B is an explanatory diagram illustrating a process of assembling the bearing device.
Figure 4C:
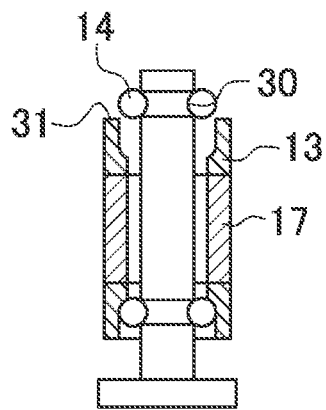
FIG. 4C is an explanatory diagram illustrating a process of assembling the bearing device.

Next, as illustrated in FIG. 4B, the outer ring spacer 17 is placed upon the first outer ring 12 in a state in which the flange portion 25 is on the lower side in the vertical direction and the center axis of the rotational shaft 11 is positioned to extend in the vertical direction. Next, as illustrated in FIG. 4C, the second outer ring 13 is placed upon the outer ring spacer 17 with the front face 31 facing the upper side in the vertical direction, and the balls 14 are placed along the second inner-side raceway surface 30. At this stage, the C-spacer 16 has not been installed yet, and the second outer ring 13 is situated below the second inner-side raceway surface 30 in the vertical direction.

Figure 4D:
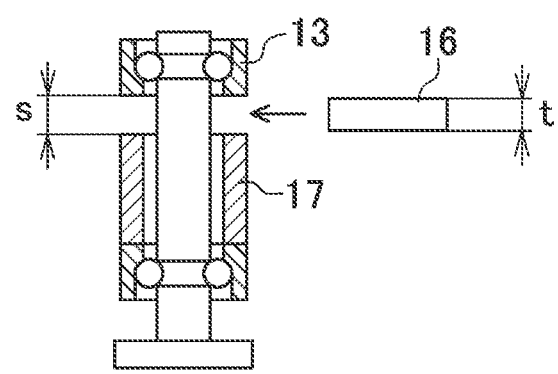
FIG. 4D is an explanatory diagram illustrating a process of assembling the bearing device.

Thereafter, the second outer ring 13 is moved toward the upper side in the vertical direction and fitted to the outer circumferences of the balls 14, thereby assembling the second bearing 22, as illustrated in FIG. 4D. In this state, the C-spacer 16 is attached between the second outer ring 13 and the outer ring spacer 17. The C-spacer 16 is attached between the second outer ring 13 and the outer ring spacer 17 by passing the rotational shaft 11 through the cutaway portion 36. The bearings 21 and 22 are set to have a positive clearance, and accordingly a clearance s (s=t+δL) provided between the second outer ring 13 and the outer ring spacer 17 in the axial direction is slightly larger than the dimension t of the C-spacer 16 in the axial direction. Accordingly, the C-spacer 16 can be easily inserted between the second outer ring 13 and the outer ring spacer 17 from the radial direction.

Referring to FIG. 2, the bearing device 10 assembled in this way is installed within the housing 93 of the X-ray tube 90. The housing 93 has a bottom portion, and a compression coil spring 95 is installed on the inner circumference in the bottom portion. The bearing device 10 is installed in a direction in which the second bearing 22 is disposed on the side of the bottom of the housing 93. There are clearances between the outer circumferences of the first outer ring 12 and the second outer ring 13, and the outer ring spacer 17 and the C-spacer 16, and the inner circumference of the housing 93 in the radial direction in this installation. Accordingly the first outer ring 12 and the second outer ring 13, and the outer ring spacer 17 and the C-spacer 16 can be easily inserted in the axial direction. Note that the radial-direction clearance (radius) between the bearing outside faces 27 of the outer rings 12 and 13 and the inner circumferential face of the housing 93 is approximately 0.01 mm to 0.2 mm, and that the radial-direction clearance (radius) between the outer circumferential faces of the C-spacer 16 and the outer ring spacer 17 and the inner circumferential face of the housing 93 is approximately 0.05 mm to 0.5 mm.

The bearing device 10 is installed in a state in which the compression coil spring 95 is compressed in the axial direction. A stopper ring 96 is provided at the opening side end portion of the housing 93, and the first outer ring 12, the outer ring spacer 17, the C-spacer 16, and the second outer ring 13 are pressed against the stopper ring 96 in a state in which the first outer ring 12, the outer ring spacer 17, the C-spacer 16, and the second outer ring 13 are in tight contact with each other in the axial direction. Thus, the rotational shaft 11 rotates at a predetermined position in the axial direction, with the first bearing 21 and the second bearing 22 fixed at a predetermined position in the axial direction.

Figure 7:
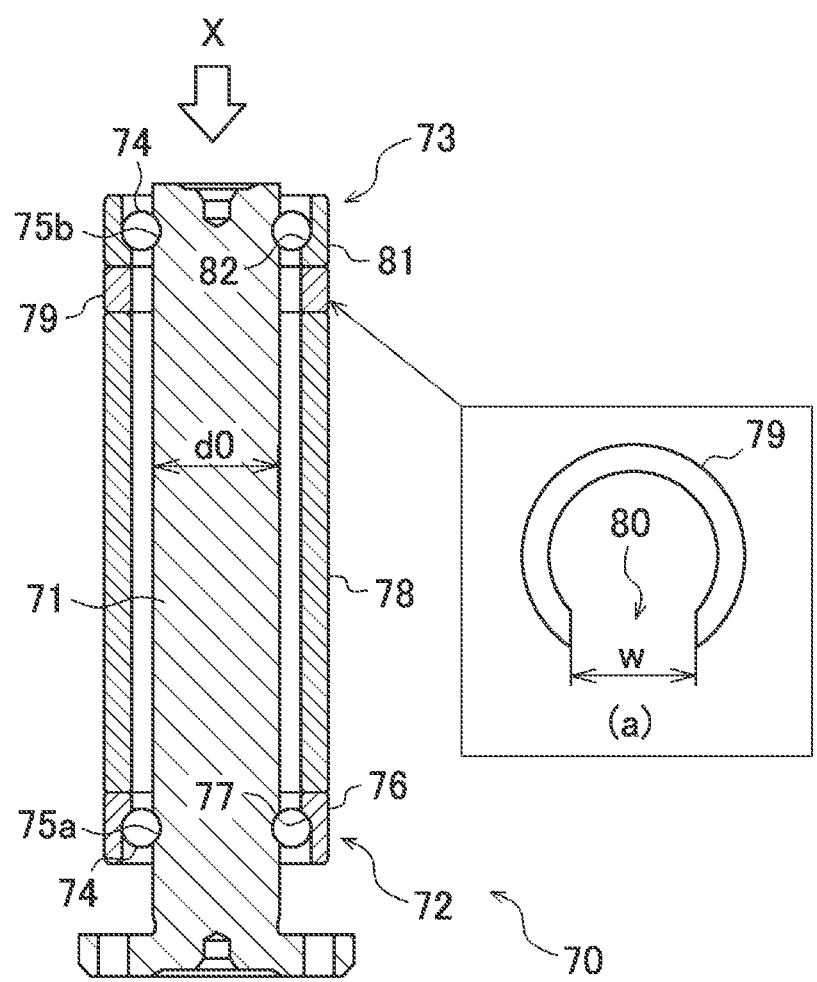
FIG. 7 is an axial direction sectional view of a bearing device in related art.

As described above, the bearings 21 and 22 are installed in a state with a positive clearance, and accordingly the C-spacer 16 and the outer ring spacer 17 may easily move in the radial direction when the bearing device 10 is handled, for example, when the bearing device 10 is installed into the X-ray tube 90. Accordingly, the C-spacer 79 may tilt and the balls 74 may fall out of the bearing device 70 in the related art (see FIG. 7), which leads to increased man-hours for reassembling and so forth.

However, with the bearing device 10 according to the present embodiment, even if the outer ring spacer 17 and/or C-spacer 16 is/are positionally displaced in the radial direction, the C-spacer 16 is restrained from tilting, and the bearing device 10 can be reliably mounted to the X-ray tube 90. The advantageous effects of restraining tilting of the C-spacer 16 will be described below.

Figure 5:
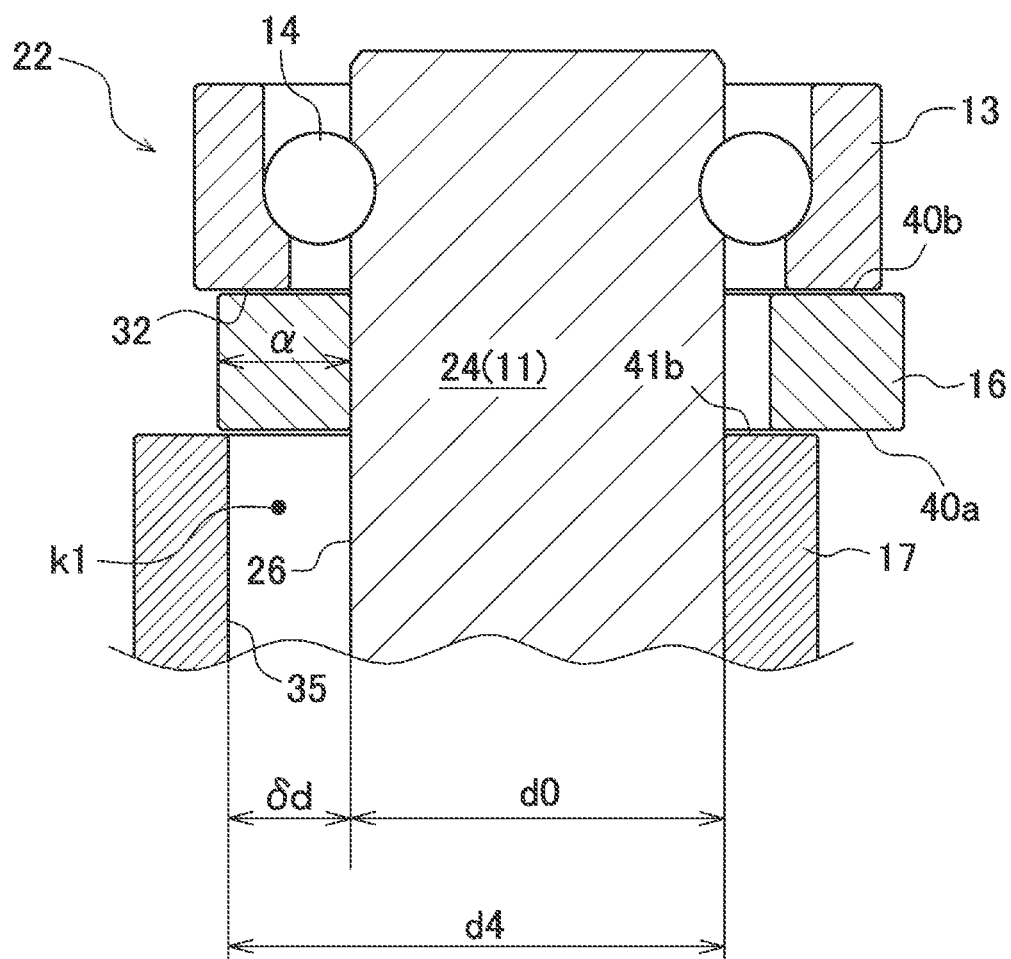
FIG. 5 is a schematic diagram illustrating a state in which the C-spacer and an outer ring spacer are positionally displaced in the radial direction.
Figure 8:
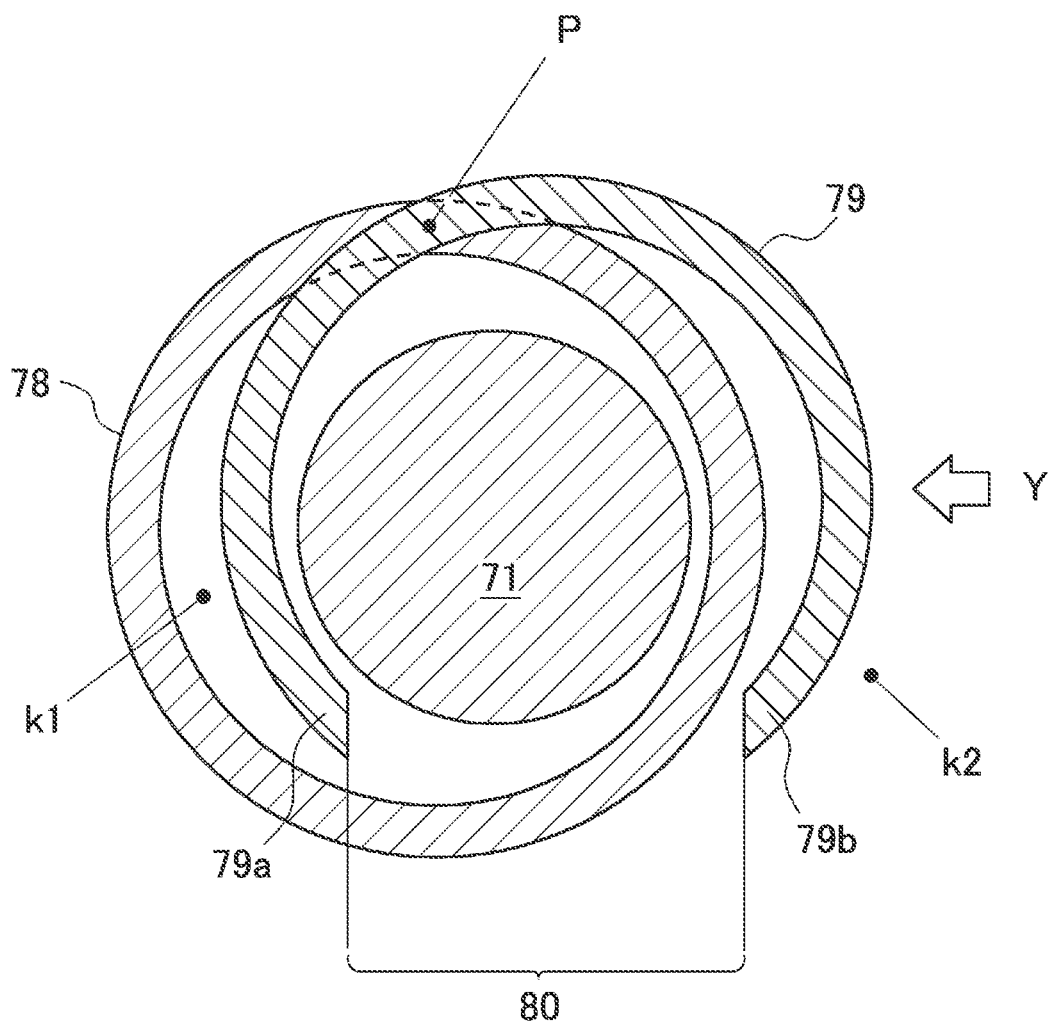
FIG. 8 is a schematic diagram illustrating positions of an outer ring spacer and a C-spacer when the C-spacer tilts in the bearing device in the related art.
Figure 9:
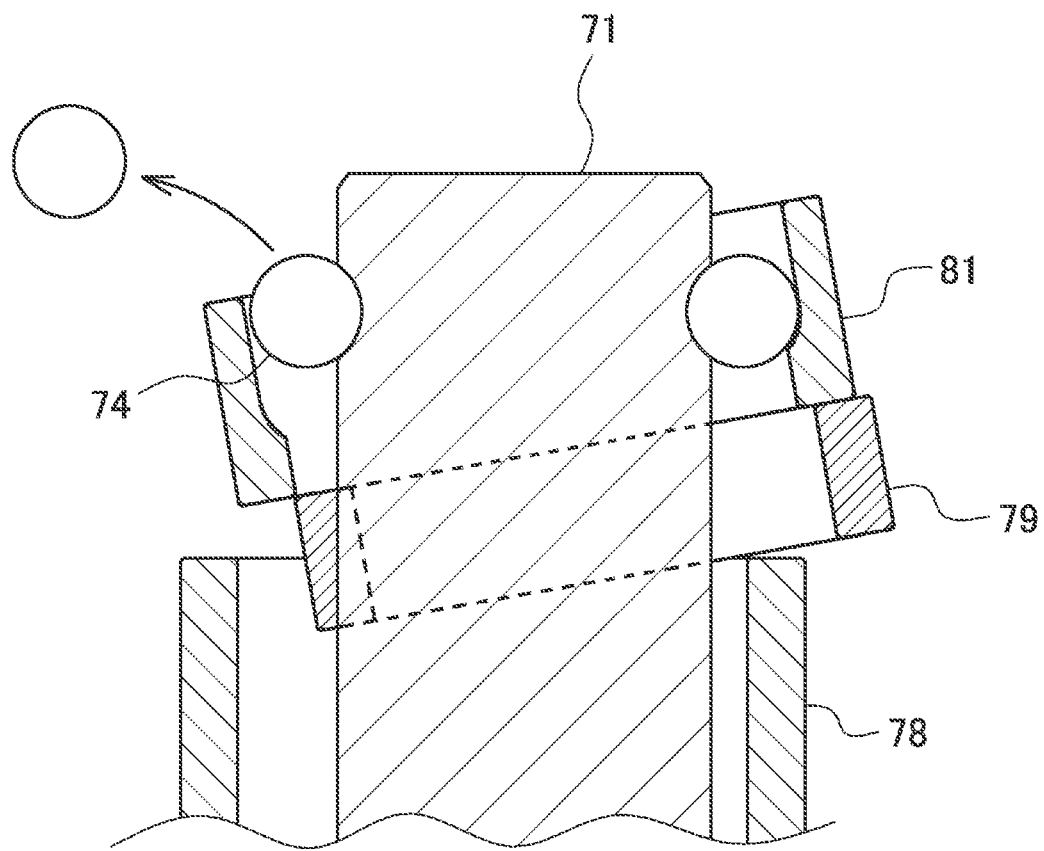
FIG. 9 is a schematic diagram illustrating the tilted state of the C-spacer in FIG. 8.

FIG. 5 is an axial direction sectional view of the second bearing 22 and the proximity thereof in the bearing device 10 in FIG. 1. FIG. 5 schematically illustrates a state in which the C-spacer 16 and the outer ring spacer 17 are positionally displaced in the radial direction. In FIG. 5, the outer ring spacer 17 is positionally displaced in the radial direction toward the left side in the drawing, and the rotational shaft 11 and the outer ring spacer 17 are in contact at the right side of the rotational shaft 11. Accordingly, a space k1 (the form of the space k1 as viewed in the axial direction is the same as that in FIG. 8) is provided between the outer circumferential face 26 of the shaft portion 24 and the inner circumferential face 35 of the outer ring spacer 17, at the left side of the rotational shaft 11. At this time, a maximum value δd of the radial-direction dimensions of the space k1 is equal to the difference (δd) between the between the inside diameter d4 of the outer ring spacer 17 and the outside diameter d0 of the outer circumferential face 26 of the shaft portion 24 of the rotational shaft 11.

On the other hand, the thickness α of the C-spacer 16 in the radial direction is set to be larger than the difference (δd) between the inside diameter d4 of the outer ring spacer 17 and the outside diameter d0 of the outer circumferential face 26 of the shaft portion 24. Accordingly, even when the C-spacer 16 faces the space k1 in the axial direction, the C-spacer 16 does not enter the space k1. In this way, the side face 40a of the C-spacer 16 is in contact with the side face 41b of the outer ring spacer 17 in the axial direction at all times, and the side face 40a of the C-spacer 16 is held to be orthogonal to the center axis m, and thus the back face 32 of the second outer ring 13 can be disposed in an orientation orthogonal to the center axis m at all times. Accordingly, the balls 14 are disposed on the inner side of the second outer ring 13 at all times, and thus the balls 14 can be reliably restrained from falling out.

The above positional relation is satisfied at least at the end portion of the outer ring spacer 17 that comes into contact with the C-spacer 16 (the second side of the outer ring spacer 17). In the present embodiment, the inner circumferential face 35 of the outer ring spacer 17 and the outer circumferential face 26 of the shaft portion 24 of the rotational shaft 11 are both cylindrical faces, and the space k1 has a uniform size in the axial direction, but this is not limiting. For example, at the middle of the outer ring spacer 17 in the axial direction, the inner circumferential face 35 may be recessed to the outer side in the radial direction, or the inner circumferential face 35 may protrude inward in the radial direction, although not illustrated.

On the other hand, consideration needs to be given to that when the thickness α of the C-spacer 16 in the radial direction is excessively large, the C-spacer 16 may contact the rotational shaft 11 and may impede rotation of the rotational shaft 11, when the bearing device 10 is installed in the housing 93.

Figure 6:
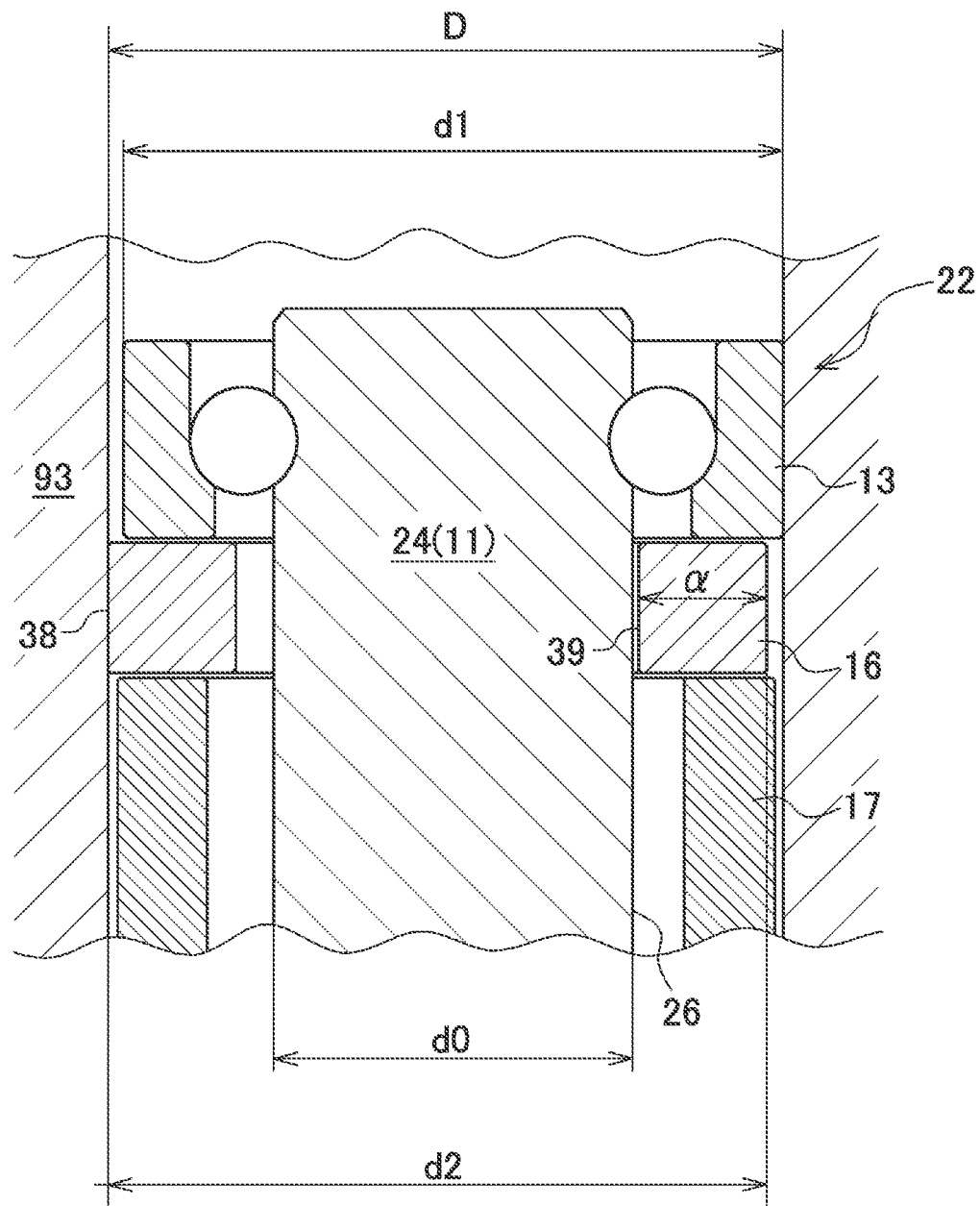
FIG. 6 is a schematic diagram illustrating a state in which parts are positionally displaced in the radial direction when the bearing device is installed in a housing.

FIG. 6 is an axial direction sectional view of the second bearing 22 and the proximity thereof, in the same way as in FIG. 5, when the bearing device 10 is attached in the housing 93 of the X-ray tube 90. FIG. 6 schematically illustrates a state in which the center axis of the second bearing 22 and the center axis of the C-spacer 16 are displaced in the radial direction with respect to the center axis of the housing 93. The bearing device 10 is attached in the housing 93 with a slight clearance in the radial direction, but the magnitude of the clearance in the radial direction of the parts is illustrated in an exaggerated way in FIG. 6, for convenience of description.

As illustrated in FIG. 6, when the second bearing 22 is positionally displaced in the radial direction toward the right in the drawing and the C-spacer 16 is also positionally displaced in the radial direction toward the left in the drawing, the inner circumferential face 39 of the C-spacer 16 and the outer circumferential face 26 of the shaft portion 24 come into close proximity in the radial direction at the right side of the rotational shaft 11. On the other hand, the outer circumferential face 38 of the C-spacer 16 comes into contact with the inner circumference of the housing 93 at the left side in the drawing, and accordingly displacement of the C-spacer 16 in the radial direction toward the left side in FIG. 6 is restricted. That is to say, the maximum value of the amount of displacement of the C-spacer 16 in the radial direction with respect to the housing 93 is equal to the difference between an inside diameter D of the housing 93 and the diameter d2 of the cylindrical face of the C-spacer 16 on the outer circumferential side.

Accordingly, in the present embodiment, a clearance greater than 0 is secured between the inner circumferential face 39 of the C-spacer 16 and the outer circumferential face 26 of the shaft portion 24 by setting the thickness α of the C-spacer 16 in the radial direction so as to satisfy $\alpha < (d1-d0)/2 - (D-d2)$, where d0 represents the outside diameter of the outer circumferential face 26 of the shaft portion 24 of the rotational shaft 11, d1 represents the outside diameter of the bearing outside face 27, d2 represents the diameter of the cylindrical face of the C-spacer 16 on the outer circumferential side, and D represents the inside diameter of the housing 93, in order to restrain the C-spacer 16 and the rotational shaft 11 from coming into contact with each other. Accordingly, contact between the C-spacer 16 and the rotational shaft 11 can be reliably avoided, and thus rotation of the rotational shaft 11 is not impeded.

Note that as illustrated in FIGS. 3A and 3B, in the present embodiment, the narrowest inner width wi at the cutaway portion 36 of the C-spacer 16 is set to be larger than the outside diameter d0 of the outer circumferential face 26 of the shaft portion 24, but may be set to be smaller than the outside diameter d0. In this case, when the C-spacer 16 is fitted to the rotational shaft 11, the cutaway portion 36 comes into contact with the outer circumference of the rotational shaft 11, whereby the C-spacer 16 exhibits elastic deformation in the direction in which the cutaway portion 36 is slightly widened. Thus, slight resistance occurs when the C-spacer 16 is fitted to the rotational shaft 11. However, once the C-spacer 16 is fitted, an amount of resistance equivalent to the amount of resistance at the time of fitting the C-spacer 16 occurs when the C-spacer 16 tries to separate from the rotational shaft 11. Accordingly, the C-spacer 16 can be restrained from suddenly falling out when an operation for attaching the bearing device 10 in the X-ray tube 90 is performed. By appropriately setting the interference between the inner width at the cutaway portion 36 and the outer circumferential face 26 of the shaft portion 24, the resistance at the time when the C-spacer 16 passes the outer circumference of the rotational shaft 11 can be reduced, so that there is no trouble in the attaching operation (i.e., the attaching work). Also, the C-spacer 16 is generally manufactured by machining a solid material. When the narrowest inner width wi at the cutaway portion 36 of the C-spacer 16 is reduced, the diameter of the inner circumferential face 39 of the C-spacer 16 is reduced, and accordingly the amount of cutting is reduced, and man-hours for working can be reduced. Further, a pair of the opening faces 37 at the cutaway portion 36 facing each other in the circumferential direction may be provided such that the distance between the opening faces 37 increases toward the outside in the radial direction and the inner width wo on the outer circumferential side of the cutaway portion 36 is larger than the outside diameter d0 of the outer circumferential face 26 of the shaft portion 24. When the C-spacer 16 is attached, the outer circumferential face 26 of the shaft portion 24 comes into contact with the opening faces 37 first, and thereafter comes into contact with the narrowest portion of the cutaway portion 36, and accordingly the C-spacer 16 can be smoothly attached.

As can be understood from the above description, according to the disclosure, when attaching the bearing device in which inner-side raceway surfaces are integrally provided on the rotational shaft, tilting of the C-spacer can be restrained, and the posture of the bearings can be reliably supported. Accordingly, balls can be reliably restrained from falling out. Thus, man-hours for reworking when attaching the bearing device can be reduced, and accordingly the efficiency of the attaching operation can be markedly improved. Although the embodiment of the disclosure has been described above, the above-described embodiment is but an example for carrying out the disclosure. The disclosure is not limited to the above-described embodiment, and can be carried out with appropriate modifications made to the above-described embodiment without departing from the scope of the disclosure.

What is claimed is:

1. A bearing device comprising:
   a rotational shaft that includes a first inner-side raceway surface on an outer circumference at a first side in an axial direction, a second inner-side raceway surface on the outer circumference at a second side in the axial direction, and a shaft outer circumferential face having a cylindrical shape between the first inner-side raceway surface and the second inner-side raceway surface;
   a first outer ring that includes a first outer-side raceway surface on an inner circumference, and a back face facing the second side in the axial direction;
   a second outer ring that includes a second outer-side raceway surface on an inner circumference, and a back face facing the first side in the axial direction;
   a plurality of first balls disposed rollably between the first inner-side raceway surface and the first outer-side raceway surface;
   a plurality of second balls disposed rollably between the second inner-side raceway surface and the second outer-side raceway surface; and
   a C-spacer and a second spacer that are disposed continuously in the axial direction, between the first outer ring and the second outer ring, wherein:
   the C-spacer is disposed between the second spacer and the second outer ring, the C-spacer is an annular body with a cutaway portion at a part of a circumference, the C-spacer has an inner circumferential face that is constituted by a part of a cylindrical face and an outer circumferential face that is constituted by a part of a cylindrical face, and a center axis of the inner circumferential face of the C-spacer is the same as a center axis of the outer circumferential face of the C-spacer;
   the second spacer, at least at an end portion of the second side, is an annular body having an inner circumferential face that is a cylindrical face and an outer circumferential face that is a cylindrical face, and a center axis of the inner circumferential face of the second spacer is the same as a center axis of the outer circumferential face of the second spacer; wherein
   in a state in which the first balls are in contact with the first inner-side raceway surface and the first outer-side raceway surface and the second balls are in contact with the second inner-side raceway surface and the second outer-side raceway surface, a dimension between the back face of the first outer ring and the back face of the second outer ring in the axial direction is longer than an axial-direction dimension obtained by adding a dimension of the C-spacer in the axial direction and a dimension of the second spacer in the axial direction; and
   the relationship $\alpha > \delta d$ is satisfied, where $\delta d$ represents a difference between an inside diameter of the second spacer at the end portion on the second side and an outside diameter of the shaft outer circumferential face, and $\alpha$ represents a half of a difference between a diameter of the cylindrical face of the C-spacer on an outer circumferential side and a diameter of the cylindrical face of the C-spacer on an inner circumferential side.

2. The bearing device according to claim 1, wherein:
   an inner width between a pair of opening faces facing each other in a circumferential direction at the cutaway portion increases toward an outer side in a radial direction;
   the relationship $wo > d0$ is satisfied, where d0 represents the outside diameter of the shaft outer circumferential face, and wo represents the inner width at the cutaway portion on the outer circumferential side of the C-spacer; and
   the relationship $wi < d0$ is satisfied, where wi represents the width at the cutaway portion on the inner circumferential side of the C-spacer.

3. A rotary device comprising:
   a housing of which an inner circumference is cylindrical; and a bearing device according to claim 1, wherein:
the bearing device is fitted in the housing; and
the relationship $\alpha<(d1-d0)/2-(D-d2)$ is satisfied, where d0 represents the outside diameter of the shaft outer circumferential face at a position of the C-spacer, d1 represents an outside diameter of a bearing outside face of the second outer ring, d2 represents the diameter of the cylindrical face of the C-spacer on the outer circumferential side, D represents an inside diameter of the housing.

* * * * *